United States Patent [19]

Broer et al.

[11] Patent Number: 4,682,853
[45] Date of Patent: Jul. 28, 1987

[54] TRANSMISSION PROJECTION SCREEN AND METHOD OF MANUFACTURING SAME

[75] Inventors: Dirk J. Broer; Renso J. M. Zwiers; Cornelis M. G. Jochem, all of Eindhoven, Netherlands

[73] Assignee: U.S. Philips Corporation, New York, N.Y.

[21] Appl. No.: 844,051

[22] Filed: Mar. 26, 1986

[30] Foreign Application Priority Data

Jan. 10, 1986 [NL] Netherlands ......................... 8600043

[51] Int. Cl.⁴ .............................................. G03B 21/60
[52] U.S. Cl. .................................................. 350/128
[58] Field of Search ........................................ 350/128

[56] References Cited

U.S. PATENT DOCUMENTS 4,525,029 6/1985 Inoue et al. ......................... 350/128

Primary Examiner—Richard A. Wintercorn
Attorney, Agent, or Firm—Thomas A. Briody; William J. Streeter; Marianne R. Rich

[57] ABSTRACT

The invention relates to a transmission projection screen having a high light output and a suitable contrast, for example, for use in a projection-television system, and a method of manufacturing such a screen.

The projection screen comprises a transparent substrate having a front surface which is provided with mutually parallel ribs. Light-absorbing glass fibers 10 are provided at the bottom of the grooves 24 between the ribs 22, and they are fixed by means of a hot-melt adhesive layer 11.

14 Claims, 4 Drawing Figures

TRANSMISSION PROJECTION SCREEN AND METHOD OF MANUFACTURING SAME

BACKGROUND OF THE INVENTION

1. Field of the Invention

The invention relates to a transmission projection screen comprising a transparent substrate having a front surface which is provided with mutually parallel ribs from which light issues during operation of the screen, grooves being present between the successive ribs, in which grooves light-absorbing thread-like elements are disposed.

The invention also relates to a method of manufacturing a transmission projection screen.

2. Description of the Prior Art

Such a screen is used, for example, for displaying images or alphanumeric data which are projected on the rear surface of the screen, for example, by a lens system with one or more cathode ray tubes or by a film projector. The transparent ribs situated on the front surface focus the light rays which are received from the rear side and which issue via the apexes of the ribs. The grooves between the ribs remain dark. In order to avoid reflection of ambient light from both the front side and the rear side of the screen, which would reduce the contrast of the image to be displayed, a light-absorbing material is disposed in the grooves. It is known that for this purpose a black lacquer layer can be applied or that black particles are disposed in the grooves. A disadvantage of such screens is the high degree of mechanical contact and, thus, optical contact between the ribs and the light-absorbing material, which causes light that should be reflected on the inside of the walls of the ribs to be absorbed, thereby reducing the light output of the screen.

U.S. Pat. No. 4,525,029 describes a transmission projection screen and a method of manufacturing such a screen, in which method black wires, for example, of yarn, metal or synthetic resin are introduced into the grooves. The black wires are longitudinally introduced into the grooves, during and/or after which operation the wires are under tension to make sure that they are in the grooves over their full length. The wires are fixed by means of, for example, glue. A disadvantage of such a screen is that it may be subject to warpage, for example, due to changing ambient conditions, humidity being a particularly important factor therein.

It is an object of the invention to provide a transmission projection screen which is not or hardly subject to warpage caused by changes in humidity and/or temperature. For this purpose, it is an object of the invention to provide a transmission projection screen in which the light-absorbing wires do not have to be under tension during or after their insertion. A further object of the invention is to provide a transmission projection screen having an aesthetically attractive, smooth front surface. A particular object of the invention is to provide a transmission projection screen having a flat or substantially flat front surface, the light-absorbing wires being situated deeply in the grooves over their full length so as not to catch the light issuing from the apexes of the ribs.

This object is achieved in accordance with the invention by a transmission projection screen as described in the opening paragraph, which screen is further characterized in that the light-absorbing elements are made of glass fibers.

Due to the great rigidity of glass, glass fibres can be deeply inserted into the grooves over their full length without being under tension. Thanks to the use of glass fibres an aesthetically attractive screen is obtained having straight and regular light-absorbing lines.

The surface of the glass fiber may be provided, for example, with a black layer. In a particularly suitable embodiment of the projection screen in accordance with the invention, the glass fiber consist of black glass.

The use of glass fibers has the additional advantage that the diameter of a glass fiber may be chosen within wide limits and may be adapted to the dimensions of the grooves in order to make sure that the glass fiber fits in the lower part of a groove, while having a sufficiently large diameter to substantially reduce the light reflection at the front side of the screen. By making sure that the contact area between the glass fibers and the walls of the grooves is small, it is possible to obtain only a marginal reduction in the light output of the screen.

An additional object of the invention is to provide a method of manufacturing a transmission projection screen, in which the light-absorbing elements can be readily fixed in the grooves.

This object is achieved in accordance with the invention by a method which is characterized in that it comprises the following steps:
  a light-absorbing glass fiber is covered with a synthetic resin coating,
  synthetic resin coated glass fibers are disposed in the grooves of the screen,
  the screen including the glass fibers is subjected to a treatment which causes the synthetic resin coating to adhere to the walls of the grooves.

Such a treatment may consist in, for example, contacting the screen with the vapour of a solvent for the synthetic resin of the synthetic resin coating.

In a very suitable embodiment of the method in accordance with the invention, the treatment for making the synthetic resin coating adhere is a heat treatment. In this case, the synthetic resin coating consists of a glue whose adhesive action is obtained by heating and subsequent cooling, a so-called "hot-melt" adhesive. An important advantage of this embodiment of the method is that glass fibers may be used which are provided with a synthetic resin coating in a separate treatment and which at some later time, for example after storage, are used in the actual manufacture of the screen, which is usually carried out in a clean room. Consequently, chemicals such as adhesive, solvents or black powdered material for providing the grooves of the projection screen with light-absorbing material do not have to be used in the clean room.

BRIEF DESCRIPTION OF THE DRAWING

An exemplary embodiment of the screen and the method in accordance with the invention are explained in more detail with reference to a drawing, in which.

DESCRIPTION OF THE PREFERRED EMBODIMENT

Figure 1A:
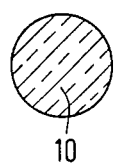
FIGS. 1a and 1b are sectional views of a glass fiber without and with a synthetic resin coating, respectively, which fiber may suitably be used in a screen in accordance with the invention.

A glass fiber is manufactured in a way which is known per se, for example, by drawing from a preform or from molten glass contained in a crucible which has a discharge opening at the bottom. The glass composition is so selected that the glass fiber has a black colour. A suitable glass composition comprises, for example, 60.2% by weight of $SiO_2$, 16.8% by weight of $B_2O_3$, 7.5% by weight of $K_2O$, 3.3% by weight of $Al_2O_3$, 0.4% by weight of $Na_2O$, 0.8% by weight of $Li_2O$, 2.7% by weight of $V_2O_5$ and 8.3% by weight of $Fe_2O_3$, which glass composition can be drawn from a preform into a fiber at a temperature of 675° C. The cross-section of the fiber may have any suitable shape, provided that it is selected so that the contact area with the walls of the grooves is small. To facilitate the insertion of the fiber, suitably, a fiber having a circular cross-section is used, see FIG. 1a. The diameter of the fiber is such, for example, 100 μm in the present example, that the fiber can be disposed at the bottom of the grooves.

Figure 1B:
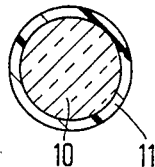

Preferably, immediately after the glass fiber is formed, it is coated with a layer of a synthetic resin composition. In FIG. 1b a glass fiber 10 is shown whose entire surface is coated with a coating 11 of a polyamide, for example, Eurelon 2140 ®, which is marketed by Schering. In this example, the thickness of the coating is 10 μm. If desired, the fiber may also be partially coated, for example on one side, with such a coating. The polyamide is applied from a solution which contains 25% by weight of polyamide in a solvent which consists of 65% by weight of n-propanol, 20% by weight of toluene and 15% by weight of water. The solution is applied by means of low-pressure extrusion after which the glass fiber is led through an oven at a temperature of 200° C. which causes the solvent to evaporate, leaving a polyamide layer on the glass fiber.

Figure 2:
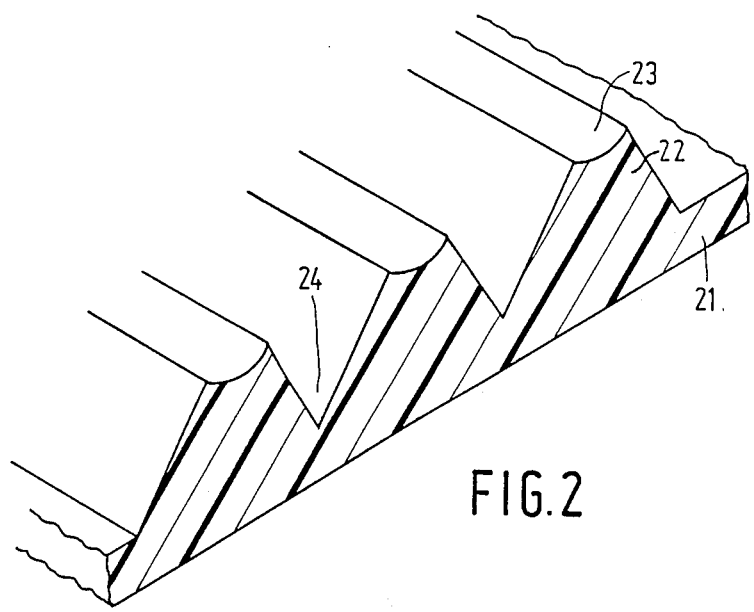
FIG. 2 is a perspective and sectional view of a substrate provided with ribs, for use in a screen in accordance with the invention.

FIG. 2 shows a substrate 21, for example, of polymethylmethacrylate, provided with ribs 22. The screen shown in the figure is flat, but the invention may also be applied to a slightly curved screen. The ribs 22 are provided at the front side with a lens structure 23. However, dependent upon the desired optical characteristic of the screen the apexes of the ribs may have various shapes. Between the ribs 22 there are mainly V-shaped grooves 24. The ribs and the grooves may be formed on the surface of the substrate by means of, for example, a replica technique which is known per se, for example, by means of a synthetic resin composition which can be cured by UV light. The rear surface of the substrate (not shown in the Figure) may also be provided with an optical element, for example, a fresnel structure. In accordance with this exemplary embodiment, the pitch between the mutually parallel grooves is 275 μm, i.e. the distance measured between the deepest points of two successive grooves, the depth of the grooves is 440 μm.

Figure 3:
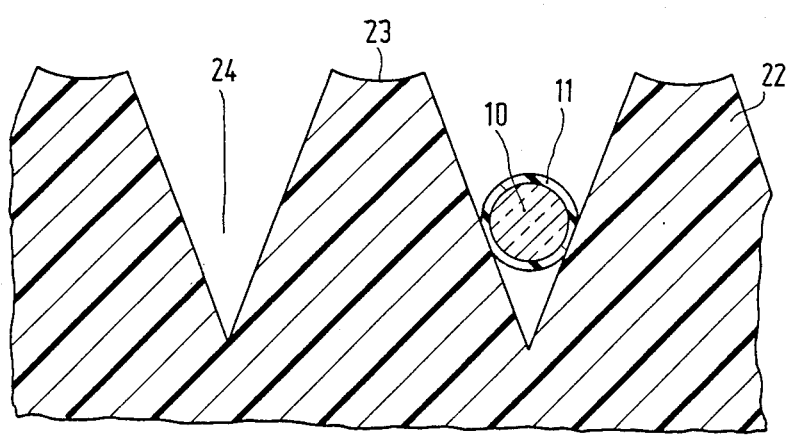
FIG. 3 is a sectional view of a screen in accordance with the invention, a glass fiber being represented in one of the grooves.

FIG. 3 shows a sectional view of a glass fiber 10 having a synthetic resin coating 11, which is located at the bottom of one of the V-shaped grooves 24. After placing glass fibers in all the appropriate grooves on the screen, preferably one fiber in each groove, the synthetic resin coating is heated to a temperature of 180° C., for a short time, for example 1 minute, and subsequently cooled to room temperature. Heating is done, for example, by means of radiation at such a wavelength that the radiation is absorbed by the black glass fibers but not by the transparent substrate. Thus, the bond between the glass fibers and the walls of the grooves is formed.

If desired, a reflective layer may be applied to the walls of the grooves in order to facilitate the internal reflection of the light in the ribs. In that case, the light-absorbing glass fibers are bonded to the rear side of such a reflecting layer.

A screen manufactured in accordance with the method described herein has an attractive appearance and is homogeneously blackened. The black bands are resistant to wear and to rubbing and cleaning using cleaning agents. The glass fibers provide a greater rigidity to the screen which is resistant to the action of moisture, such that, in particular, the tendency to warp is reduced.

What is claimed is:

1. A transmission projection screen comprising a transparent substrate having a front surface which is provided with mutually parallel ribs from which light issues during operation of the screen, grooves being present between the successive ribs, in which grooves light-absorbing thread-like elements are disposed, characterized in that the light-absorbing elements are made from glass fibres.

2. A transmission projection screen as claimed in claim 1, characterized in that the glass fibres consist of black glass.

3. A method of manufacturing a transmission projection screen as claimed in claim 1 or 2, characterized in that the method comprises the following steps:
   a light-absorbing glass fibre is covered with a synthetic resin cladding,
   synthetic resin cladded glass fibres are disposed in the grooves of the screen,
   the screen including the glass fibres is subjected to a treatment such that the synthetic-resin cladding adheres to the walls of the grooves.

4. A method as claimed in claim 3, characterized in that the treatment to make the synthetic resin cladding adhere is a heat treatment.

5. A transmission projection screen, comprising
   a transparent substrate having a surface having a plurality of ribs separated by grooves; and
   a multiplicity of glass fibers each having a predetermined cross-section and a predetermined color disposed in said plurality of grooves for absorbing ambient light falling on said screen.

6. A transmission projection screen as claimed in claim 5, wherein said predetermined color is black.

7. A transmission projection screen as claimed in claim 5, wherein said cross-section is circular.

8. A transmission projection screen as claimed in claim 5, further comprising a coating covering at least part of each of said glass fibers.

9. A transmission projection screen as claimed in claim 8, wherein said coating is a synthetic resin coating.

10. A transmission projection screen as claimed in claim 5, wherein at least one of said glass fibers is disposed in each of said plurality of grooves.

11. A transmission projection screen as claimed in claim 5, wherein said grooves are V-shaped having a narrow and a wide portion; and wherein said glass fibers have a diameter fitting into said narrow portion.

12. A method for creating blackening in manufacturing a transmission projection screen having a plurality of ribs separated by grooves, comprising the steps of
  manufacturing a glass fiber having a predetermined color and cross-section;
  coating said glass fibers at least in part with an adhesive coating; and
  placing said glass fibers with said coating into said grooves.

13. A method as claimed in claim 12, wherein said predetermind color is black.

14. A method as claimed in claim 12, wherein said coating step comprises coating said glass fibers with a synthetic resin;
  further comprising the step of heat treating said glass fiber with said coating after placement into said grooves thereby coating a bond between said glass fibers and said grooves.

* * * * *